United States Patent
Joung et al.

(10) Patent No.: US 8,518,335 B2
(45) Date of Patent: Aug. 27, 2013

(54) SYSTEM FOR PREPARING SILICA AEROGEL POWDER

(75) Inventors: Young Chul Joung, Suwon-si (KR); Myung Je Roe, Seoul (KR); Young Jong Yoo, Hwaseong-si (KR); Jong Chul Park, Hwaseong-si (KR); Hee Jung Choi, Seongnam-si (KR); Min Woo Kim, Daejeon-si (KR)

(73) Assignee: Jios Aerogel Limited, Hong Kong (CN)

( * ) Notice: Subject to any disclaimer, the term of this patent is extended or adjusted under 35 U.S.C. 154(b) by 169 days.

(21) Appl. No.: 13/161,989

(22) Filed: Jun. 16, 2011

(65) Prior Publication Data

US 2012/0244040 A1   Sep. 27, 2012

(30) Foreign Application Priority Data

Mar. 23, 2011   (KR) .................. 10-2011-0025718

(51) Int. Cl.
*B01J 19/00* (2006.01)
*C01B 33/12* (2006.01)

(52) U.S. Cl.
USPC ........... 422/225; 422/240; 422/187; 422/129; 422/198; 422/307; 423/338

(58) Field of Classification Search
USPC .................. 422/240, 225, 307, 187, 198, 129
See application file for complete search history.

(56) References Cited

U.S. PATENT DOCUMENTS

2010/0233061 A1*   9/2010   Park et al. ............... 423/338
2012/0025127 A1*   2/2012   Yeo et al. ................. 252/62

* cited by examiner

*Primary Examiner* — Walter D Griffin
*Assistant Examiner* — Lessanework Seifu
(74) *Attorney, Agent, or Firm* — Kile Park Reed & Houtteman PLLC

(57) ABSTRACT

A system for preparing silica aerogel powders. The system includes a material supplier, a mixer, a drier and a recoverer. The material supplier transmitting de-ionized water, water glass, an organosilane compound, an inorganic acid and at least one organic solvent. Some of organic solvents are mixed and transmitted to the mixer and tramining organic solvent is transmitted to the mixer. The mixer mixes the materials transmitted from the material supplier so as to generate silica hydrogel. The drier dries the silica hydrogel so as to generate silica aerogel powders. The recoverer recovers some vaporized materials of the materials used in the mixer and the drier.

20 Claims, 3 Drawing Sheets

US 8,518,335 B2

SYSTEM FOR PREPARING SILICA AEROGEL POWDER

CROSS-REFERENCE TO RELATED PATENT APPLICATION

This application claims the benefit of Korean Patent Application No. 10-2011-0025718, filed on Mar. 23, 2011, in the Korean Intellectual Property Office, the disclosure of which is incorporated herein in its entirety by reference.

BACKGROUND OF THE INVENTION

1. Field of the Invention

One or more aspects of the present invention relate to systems for preparing silica aerogel powders, and more particularly, to systems for preparing silica aerogel powders, which consecutively perform material-supplying, material-synthesizing, drying and collecting.

2. Description of the Related Art

Silica gel represented by $SiO_2 \cdot nH_2O$ has $SiO_2$ particles in which fine pores are connected to each other to constitute a rigid net structure. Each $SiO_2$ particle is an amorphous particle that has high porosity of 90% or more and a specific surface area of 600 $m^2/g$ or more and is formed by solidifying a solvent such as water between $SiO_2$ particles. Since silica gel has a wide surface area, silica gel has very high absorption with respect to alcohol or water, and thus silica gel may be used as a dehumidifier. Also, silica gel may be used as a heat insulating material, a catalyst carrier, an insulating material or the like. Likewise, even though silica gel is widely used in various fields, silica gel is very restrictively used. This is because there are a number of dangers related to preparation processes, and the preparation processes are complicated, thus increasing preparation costs.

SUMMARY OF THE INVENTION

One or more aspects of the present invention provide systems for preparing silica aerogel powders.

According to an aspect of the present invention, there is provided a system for preparing silica aerogel powders including a material supplier, a mixer, a drier and a recoverer. The material supplier transmits de-ionized water, water glass, an organosilane compound, an inorganic acid and at least one organic solvent to the mixer. Some of organic solvents are mixed and transmitted to the mixer and remaining organic solvent is transmitted to mixer as it is. The mixer mixes the materials transmitted from the material supplier so as to generate silica hydrogel. The drier dries the silica hydrogel so as to generate silica aerogel powders. The recoverer recovers some vaporized materials of the materials used in the mixer and the drier.

As described above, since a silica aerogel powder preparing system according to an embodiment of the present invention may consecutively and automatically perform material-supplying, material-synthesizing, drying and collecting, silica aerogel powders may be massively produced.

In addition, a solvent used in a process of preparing silica aerogel powders is recovered and condensed and then is reused in necessary processes, thereby saving materials.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
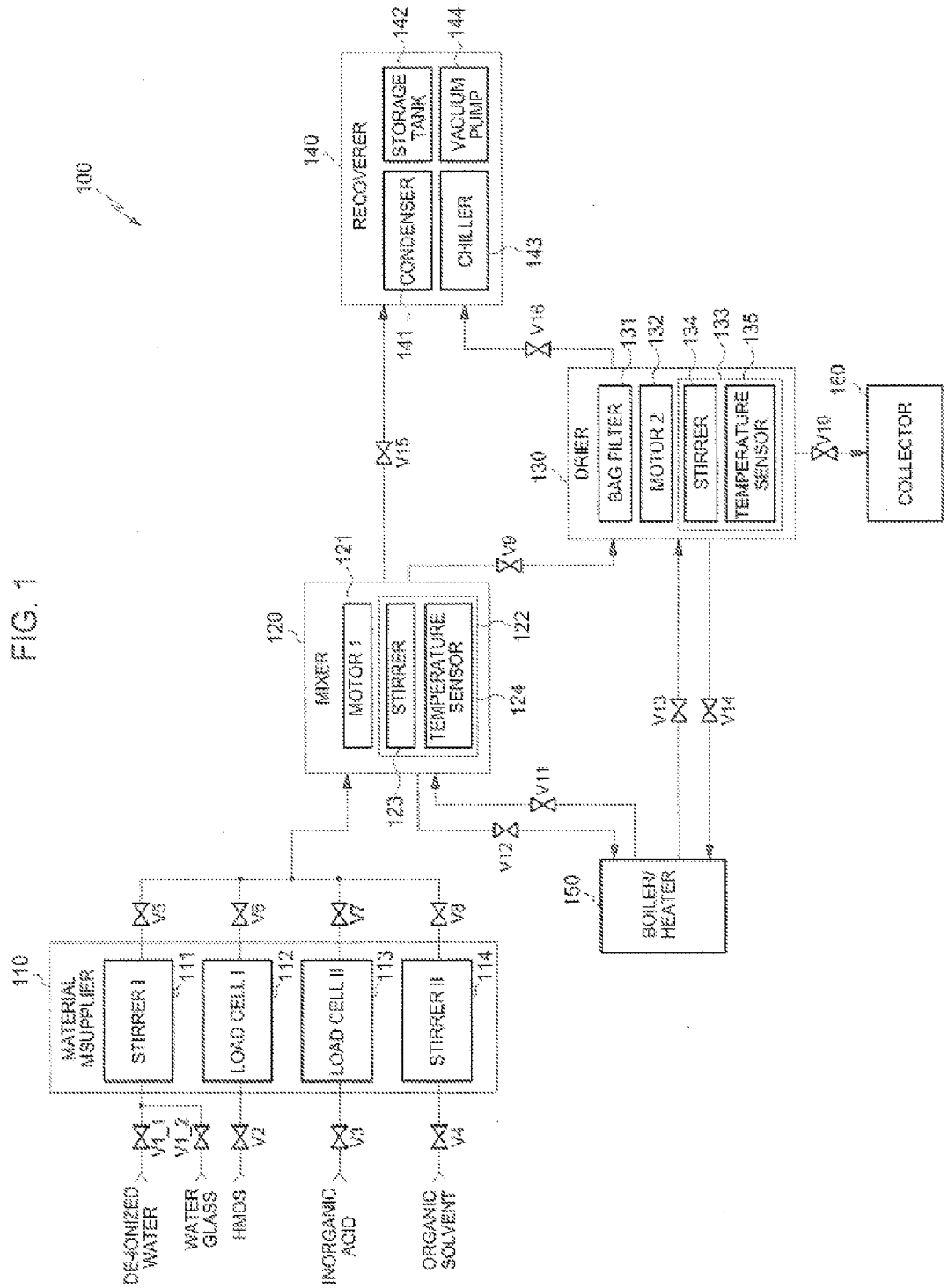
FIG. 1 is a block diagram of a system for preparing silica aerogel powders according to an embodiment of the present invention.

Hereinafter, the present invention will be described in detail by explaining exemplary embodiments thereof with reference to the attached drawings. Like reference numerals in the drawings denote like elements.

FIG. 1 is a block diagram of a system 100 for preparing silica aerogel powders according to an embodiment of the present invention.

Referring to FIG. 1, the silica aerogel powder preparing system 100 includes a material supplier 110, a mixer 120, a drier 130, a recoverer 140, a boiler/heater 150 and a collector 160.

The material supplier 110 transmits de-ionized water, water glass, an organosilane compound, an inorganic acid and at least one organic solvent to the mixer 120. Some of the organic solvent are mixed and then transmitted to the mixer 120 and remaining organic solvent is transmitted to the mixer 120. In addition, the material supplier 110 includes a first stirrer 111, a second stirrer 114, a first storage tank 112 and a second storage tank 113.

The first stirrer 111 generates a water glass solution by mixing de-ionized water and water glass at a predetermined ratio. In this case, the de-ionized water refers to water from which ions such as $Mg^+$, $Ca^+$ and the like are almost all removed. The water glass is a thick aqueous solution containing sodium silicate (liquid state) obtained by melting silicon dioxide and alkali. The water glass may be prepared by melting a mixture of silica and soda ash at a temperature of 1,300° C. to 1,500° C. and then processing the resulting material in a low-pressure steam cooker. De-ionized water and water glass are stored in respective storage containers (not shown). The storage containers are connected to the first stirrer 111 through connection tubes. Two first valves V1_1 and V1_2 are installed in the middle of the connection tubes, respectively. Thus, by controlling opening and closing of the two first valves V1_1 and V1_2, whether de-ionized water and glass water are introduced to the first stirrer 111 may be controlled and amounts of the de-ionized water and glass water that are introduced to the first stirrer 111 may be adjusted. The first stirrer 111 and the mixer 120 are connected to each other through a connection tube. A fifth valve V5 is installed in the middle of the connection tube. By controlling opening and closing of the fifth valve V5, whether a water glass solution mixed in the first stirrer 111 is transmitted to the mixer 120 may be controlled and an amount of the water glass solution transmitted to the mixer 120 may be adjusted.

At least one organic solvent is introduced to the second stirrer 114. When at least one organic solvent is introduced, the organic solvent is transmitted to the mixer 120. However, when a plurality of organic solvents is introduced, a mixture solution of the organic solvents is transmitted to the mixer 120. The organic solvents are stored in respective storage containers (not shown). The storage containers are connected to the second stirrer 114 through connection tubes. A fourth valve V4 is installed in the middle of the connection tubes. FIG. 1 illustrates a single connection tube and a single valve since only a single organic solvent is transmitted. However, when a plurality of organic solvents is used, storage containers, the respective number of connection tubes and valves used is the same as the number of the plurality of organic solvents. By controlling opening and closing of the fourth valve V4, whether an organic solvent is transmitted to the second stirrer 114 may be controlled and an amount of the organic solvent transmitted to the second stirrer 114 may be adjusted. The second stirrer 114 and the mixer 120 are connected to each other through a connection tube. An eighth valve V8 is installed in the middle of the connection tube. By controlling opening and closing of the eighth valve V8, a type of an organic solvent transmitted to the second stirrer 114 and an amount of the organic solvent transmitted to the second stirrer 114 may be adjusted. In this case, the organic solvent refers to a nonpolar organic solvent such as an n-hexane solution, an n-heptane solution, toluene and xylene.

The first storage tank 112 including a first load cell stores an organosilane compound, that is, hexamethyldisilazane (HMDS), which was transmitted to the mixer 120. A load cell, which is required for an electronic scale that indicates a weight as numbers, is a device for measuring a weight. The organosilane compound (HMDS) is stored in a storage container (not shown). The storage container of the organosilane compound and the first storage tank 112 are connected to each other through a connection tube. A second valve V2 is installed in the middle of the connection tube. Thus, by controlling opening and closing of the second valve V2, whether the organosilane compound (HMDS) is transmitted to the first storage tank 112 may be controlled and an amount of the organosilane compound (HMDS) transmitted to the first storage tank 112 may be adjusted. The first storage tank 112 and the mixer 120 are connected to each other through a connection tube. A sixth valve V6 is installed in the middle of the connection tube. By controlling opening and closing of the sixth valve V6, whether the organosilane compound in the first storage tank 112 is transmitted to the mixer 120 may be controlled and an amount of the organosilane compound transmitted to the mixer 120 may be adjusted.

The second storage tank 113 including a second load cell stores inorganic acid transmitted to the mixer 120. In this case, the organic acid may be $HNO_3$. $HNO_3$ is stored in a storage container (not shown). A storage container for inorganic acid and the second storage tank 113 are connected to each other through a connection tube. A third valve V3 is installed in the connection tube. Thus, by controlling opening and closing of the third valve V3, whether inorganic acid is transmitted to the second storage tank 113 may be controlled and an amount of the inorganic acid transmitted to the second storage tank 113 may be adjusted. The second storage tank 113 and the mixer 120 are connected to each other through a connection tube. A seventh valve V7 is installed in the middle of the connection tube. By controlling opening and closing of the seventh valve V7, whether inorganic acid stored in the second storage tank 113 is transmitted to the mixer 120 may be controlled and an amount of the inorganic acid transmitted to the mixer 120 may be adjusted.

In this case, the first load cell 112 and the second load cell 113 have been each described as a device for measuring a weight. In reality, the first load cell 112 and the second load cell 113 are each a storage tank including a load cell. That is, the first load cell 112 and the second load cell 113 may each measure an amount of a material introduced to and stored in a corresponding storage tank and may transmit the stored material to the mixer 120 through a connection tube.

Although not illustrated in FIG. 1, in consideration of chemicophysical properties of various materials and lifetimes of pump components, materials contained in storage containers may be transmitted to the mixer 120 by using a diaphragm pump using pipes formed of steel us stainless (SUS) and coated by Teflon.

The supplying order of materials supplied to the mixer 120 is controlled according to a predetermined order that is determined by a controller (not shown). The mixing order of mixed materials is set in consideration of the stabilities and the like of chemical reactions of the mixed materials.

The mixer 120 mixes materials transmitted from the material supplier 110 so as to generate silica hydrogel and includes a first motor 121 and a mixing tank 122. The mixing tank 122 includes a stirrer 123 including a stirring shaft (not shown) that is rotated by the first motor 121 and on which a plurality of impellers (not shown) are installed and a temperature sensor 124 for measuring an internal temperature of the mixing tank 122. The mixer 120 and the drier 130 are connected to each other through a connection tube. By controlling opening and closing of a ninth valve V9 installed in the middle of the connection tube, silica hydrogel generated by the mixer 120 is transmitted to the drier 130.

The drier 130 dries silica hydrogel generated by the mixer 120 to generate silica aerogel powders and includes a bag filter 131, a second motor 132 and a drying tank 133. The bag filter 131 is a device for collecting fine dust contained in gas, which are not capable of being collected by a cyclone dust collector, by filtering the dust into a bag. According to an embodiment of the present invention, the bag filter 131 is used so that when an organic solvent is recovered while a drying operation is being performed, silica aerogel powders may not be contained in the organic solvent. In order to prevent pores of the bag filter 131 from being clogged while the vaporized organic solvent is being recovered, air at a high pressure needs to be introduced to the bag filter 131. The drying tank 133 includes a stirrer 134 including a stirring shaft (not shown) that is rotated by the second motor 132 and on which a plurality of impellers (not shown) are installed and a temperature sensor 135 for measuring an internal temperature of the drying tank 133. The drier 130 and the collector 160 are connected to each other through a connection tube, and a tenth valve V10 is installed in the middle of the connection tube. By controlling opening and closing of the tenth valve V10, silica aerogel powders generated by the drier 130 are transmitted to the collector 160.

The recoverer 140 recovers the organic solvent vaporized in the mixer 120 and the drier 130 and includes a condenser 141, a storage tank 142, a chiller 143 and a vacuum pump 144. The mixer 120 and the recoverer 140, and the drier 130 and the recoverer 140 are connected to each other through connection tubes. A fifteenth valve V15 and a sixteenth valve V16 are installed in the middle of the connection tubes, respectively. By controlling opening and closing of the fifteenth valve V15, the organic solvent vaporized in the mixer 120 may be recovered. By controlling opening and closing of the sixteenth valve V16, the organic solvent vaporized in the drier 130 is recovered. The condenser 141 liquefies the vaporized organic solvent and the storage tank 142 stores the liquefied organic solvent. The chiller 143 and the vacuum pump 144 are used to control temperature and pressures of the condenser 141 and the storage tank 142.

The boiler/heater 150 refers to a therm oil boiler for transmitting therm oil to the mixer 120 and the drier 130 or refers to a heater for transmitting hot air to the mixer 120 and the drier 130. Gelating and solvent-exchange performed in the mixer 120 are affected by a surrounding temperature and may be performed at a temperature of 30 to 40°. The boiler/heater 150 is a means of heating the mixer 120 and provides therm oil and heat. Drying performed in the drier 130 is affected by a surrounding temperature. Generally, when drying is performed at room temperature to a temperature of 150°, a highest drying efficiency is obtained.

The mixer 120 and the boiler/heater 150 are connected to each other through two tubes. One transmits therm oil or heat, which is output from the boiler/heater 150, to the mixer 120. The other one recovers therm oil or heat of the mixer 120 to the boiler/heater 150. The two tubes are installed in the middle of an eleventh valve V11 and a twelfth valve V12, respectively. Thus, by controlling opening and closing of the eleventh valve V11, transmission of therm oil or heat to the mixer 120 is controlled. By controlling opening and closing of the twelfth valve V12, the therm oil or heat of the mixer 120 is recovered by the boiler/heater 150.

The drier 130 and the boiler/heater 150 are connected to each other through two tubes. One transmits therm oil or heat, which is output from the boiler/heater 150, to the drier 130. The other one recovers therm oil or heat of the drier 130 to the boiler/heater 150. A thirteenth valve V13 and a fourteenth valve V14 are installed in the middle of the two tubes, respectively. Thus, by controlling opening and closing of the thirteenth valve V13, transmission of therm oil or heat to the drier 130 may be controlled. By controlling opening and closing of the fourteenth valve V14, the therm oil or heat of the drier 130 is recovered by the boiler/heater 150.

In order to change temperatures of the mixer 120 and the drier 130, the therm oil or heat provided by the boiler/heater 150 may be used. In addition, heating coils may be installed in the mixing tank 122 and the drying tank 133 that constituted the mixer 120 and the drier 130, respectively, which will be described in detail with reference to FIGS. 2 through 5.

Figure 2:
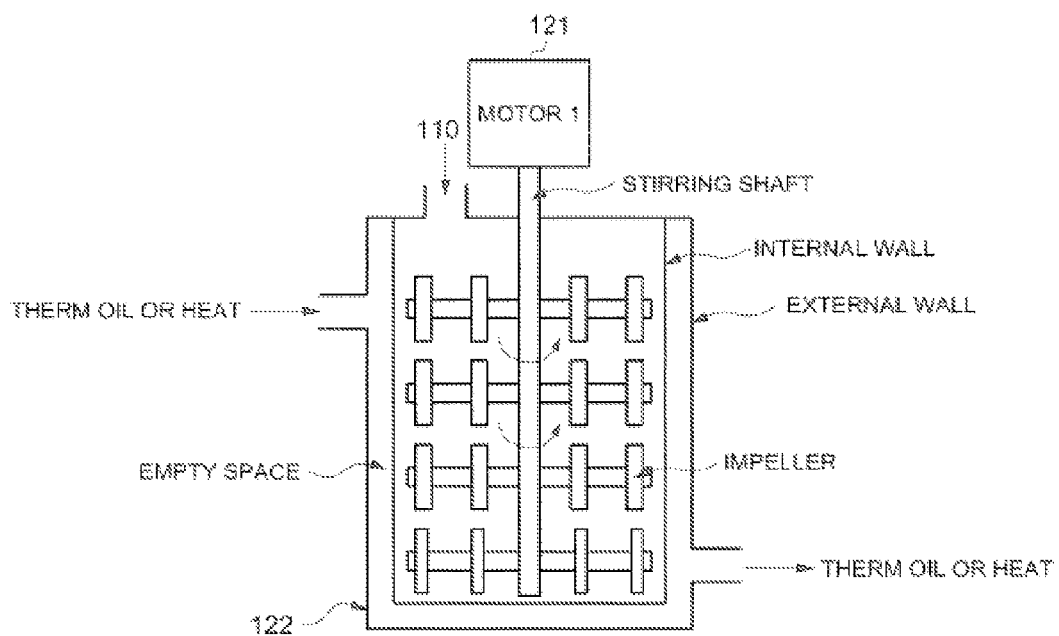
FIG. 2 is a diagram of a mixer for controlling a temperature by using therm oil or heat, according to an embodiment of the present invention.

FIG. 2 is a diagram of the mixer 120 for controlling a temperature by using therm oil or heat, according to an embodiment of the present invention. Referring to FIG. 2, the mixer 120 includes the first motor 121 and the mixing tank 122. The mixing tank 122 mixes materials introduced from the material supplier 110 so as to generate silica hydrogel and includes a stirring shaft connected to the first motor 121 and a plurality of impellers connected to the stirring shaft. In the mixing tank, an empty space is formed between an internal wall and an external wall. Therm oil or heat is transmitted to the empty space so as to control a temperature of the mixing tank 122. Then, the therm oil or heat that completes a heating function is recovered by the boiler/heater 150.

Figure 3:
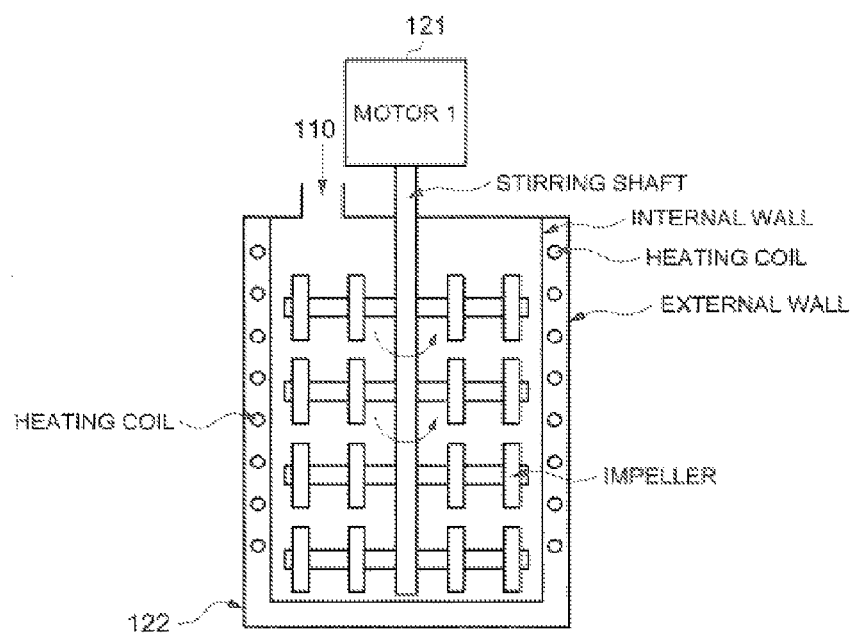
FIG. 3 is a diagram of a mixer for controlling a temperature by using a heating coil, according to another embodiment of the present invention.

FIG. 3 is a diagram of a mixer for controlling a temperature by using a heating coil, according to another embodiment of the present invention. Referring to FIG. 3, the heating coil installed between an internal wall and an external wall of the mixing tank 122 controls an internal temperature of the mixing tank 122.

Figure 4:
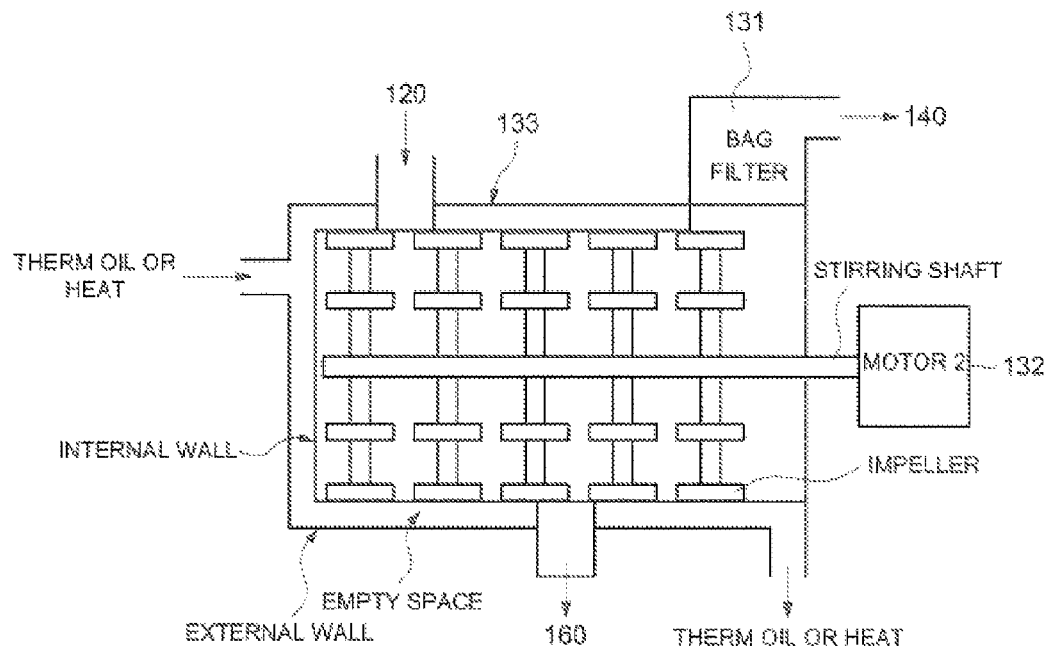
FIG. 4 is a diagram of the drier for controlling a temperature by using therm oil or heat, according to an embodiment of the present invention.

FIG. 4 is a diagram of the drier 130 for controlling a temperature by using therm oil or heat, according to an embodiment of the present invention. Referring to FIG. 4, the drier 130 includes the second motor 132 and the drying tank 133. The drying tank 133 dries silica hydrogel introduced from the mixer 120 so as to generate silica aerogel powders and transmits the generated silica aerogel powders to the collector 160. The drying tank 133 includes a stirring shaft connected to the second motor 132 and a plurality of impellers connected to the stirring shaft. In the drying tank 133, an empty space is formed between an internal wall and an external wall. Therm oil or heat is transmitted to the empty space so as to control a temperature of the drying tank 133. Then, the therm oil or heat that completes a heating function is recovered by the boiler/heater 150.

Figure 5:
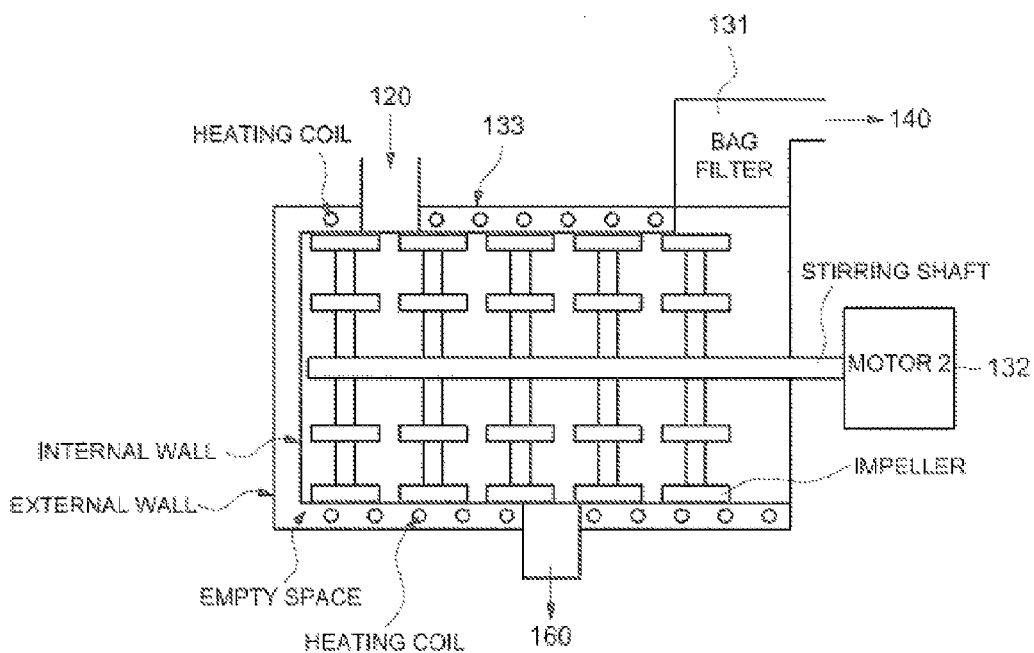
FIG. 5 is a diagram of a drier for controlling a temperature by using a heating coil, according to another embodiment of the present invention.

FIG. 5 is a diagram of a drier for controlling a temperature by using a heating coil, according to another embodiment of the present invention. Referring to FIG. 5, a heating coil installed between an internal wall and an external wall of the drying tank 133 controls an internal temperature of the drying tank 133.

A portion of an impeller constituting the drying tank 133 of FIGS. 4 and 5, which contacts an inner surface of the drying tank 133, is formed of Teflon. Due to the impeller formed of Teflon, when silica aerogel powders are discharged after a drying operation is completed, no residue is left in the drying tank 133.

Although not illustrated in FIGS. 1 through 5, opening and closing of a plurality of valves are controlled by a controller (not shown) of a system. A function of the controller may be controlled or a processing result of the controller may be checked by using program logic control (PLC) or a touch screen. Although not illustrated, in order to open and close valves, a compressor or ultra-pure water plants for supplying de-ionized water may be used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for preparing silica aerogel powders, the system comprising:
   a material supplier for transmitting de-ionized water, water glass, an organosilane compound, an inorganic acid and at least one organic solvent to the mixer;
   a mixer for mixing the materials transmitted from the material supplier so as to generate silica hydrogel;
   a drier for drying the silica hydrogel so as to generate silica aerogel powders; and
   a recoverer for recovering some vaporized materials of the materials used in the mixer and the drier,
   wherein some of organic solvents are mixed and then transmitted to the mixer and remaining organic solvent is transmitted to the mixer as it is.

2. The system of claim 1, wherein the inorganic acid comprises $HNO_3$, wherein the organic solvent is a nonpolar organic solvent, and wherein the organosilane compound comprises hexamethyldisilazane (HMDS).

3. The system of claim 1, further comprising at least one of:
   a therm oil boiler for transmitting therm oil to the mixer and the drier; and
   a heater for transmitting heat to the mixer and the drier.

4. The system of claim 3, wherein the material supplier comprises:
   a first stirrer for generating a water glass solution by mixing de-ionized water and water glass at a predetermined ratio;
   a second stirrer, when at least two organic solvents are input to the second stirrer, for mixing the at least two organic solvents;
   a first storage tank comprising a first load cell for measuring an introduced amount of the organosilane compound; and a second storage tank comprising a second load cell for measuring an introduced amount of the inorganic acid.

5. The system of claim 4, wherein materials output from the first stirrer, the second stirrer, the first storage tank and the second storage tank are transmitted to the mixer according to a predetermined order.

6. The system of claim 3, wherein the mixer comprises:
a first motor; and
a mixing tank, wherein the mixing tank comprises:
a stirrer rotated by the first motor and comprising a stirring shaft on which a plurality of impellers are installed; and
a temperature sensor for measuring an internal temperature of the mixing tank.

7. The system of claim 6, wherein a predetermined space is formed between an internal wall and an external wall of the mixing tank, and
wherein the therm oil or the heat is supplied to the predetermined space so as to increase the internal temperature of the mixing tank.

8. The system of claim 3, wherein the drier comprises:
a second motor; and
a drying tank, wherein the drying tank comprises:
a stirring shaft that is rotated by the second motor and on which a plurality of impellers are installed;
a temperature sensor for measuring an internal temperature of the drier; and
a filter for filtering some vaporized materials.

9. The system of claim 8, wherein a predetermined space is formed between an internal wall and an external wall of the drying tank, and
wherein the therm oil or the heat is supplied to the predetermined space so as to increase the internal temperature of the mixing tank.

10. The system of claim 8, wherein a portion of each impeller, which contacts the drying tank, is formed of Teflon.

11. The system of claim 1, wherein the recoverer comprises:
a condenser for liquefying the vaporized material; and
a storage tank for storing a liquefied material.

12. The system of claim 11, wherein the vaporized material comprises an organic solvent.

13. The system of claim 11, wherein the recoverer further comprises:
a chiller for decreasing temperatures of the condenser and the storage tank; and a vacuum pump for adjusting pressures of the condenser and the storage tank.

14. The system of claim 1, wherein the de-ionized water, the water glass, the organosilane compound, the inorganic acid and the at least one organic solvent, which are stored in respective corresponding material containers, are transmitted to the material supplier through a diaphragm pump installed in each material container.

15. The system of claim 1, further comprising a collector for collecting the silica aerogel generated in the drier.

16. The system of claim 15, wherein at least one connection tube is installed between the material supplier and the mixer, between the mixer and the drier, between the drier and the recoverer, between the mixer and the recoverer and between the drier and the collector, and
wherein at least one connection tube is opened and closed by at least one valve.

17. The system of claim 3, wherein at least one connection tube is connected between the mixer and the therm oil boiler and between the drier and the therm oil boiler, or between the mixer and the heater and between the drier and the heater, and
wherein at least one connection tube is opened and closed by at least one valve.

18. The system of claim 1, wherein the mixer comprises:
a first motor; and
a mixing tank, wherein the mixing tank comprises:
a first heating coil installed outside the mixing tank;
a stirrer rotated by the first motor and comprising a stirring shaft on which a plurality of impellers are installed; and
a temperature sensor for measuring an internal temperature of the mixer.

19. The system of claim 1, wherein the drier comprises:
a second motor; and
a drying tank, wherein the drying tank comprises:
a second heating coil installed outside the drying tank;
a stirrer rotated by the second motor and comprising a stirring shaft on which a plurality of impellers are installed;
a temperature sensor for measuring an internal temperature of the drier; and
a filter for filtering some vaporized materials.

20. The system of claim 19, wherein a portion of the impeller, which contacts the drying tank, is formed of Teflon.

* * * * *